United States Patent Office 2,955,790
Patented Oct. 11, 1960

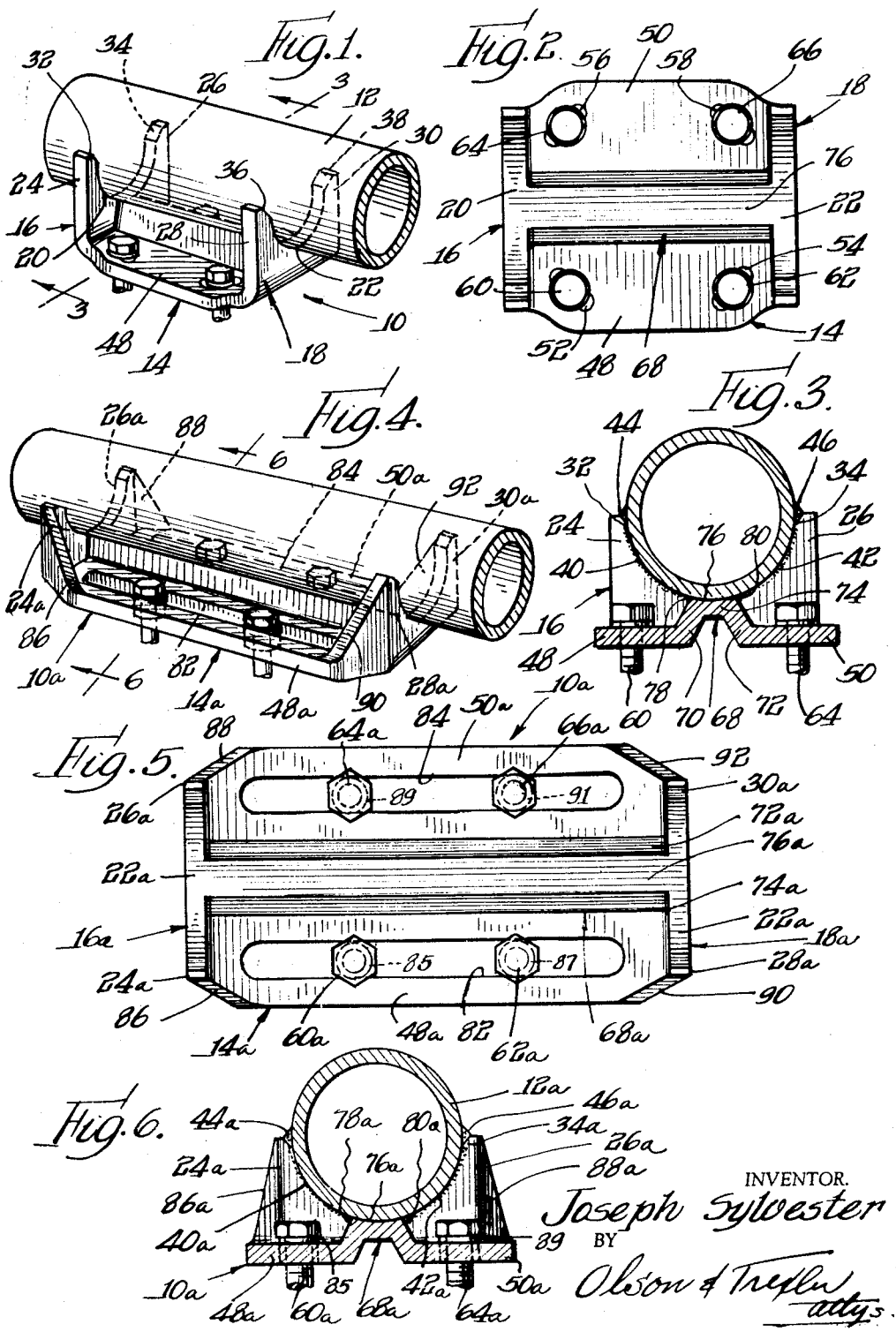

2,955,790

ELECTRICAL BUS SUPPORT

Joseph Sylvester, Erie, Pa., assignor to Penn-Union Electric Corporation, Erie, Pa., a corporation of Pennsylvania Filed Dec. 14, 1956, Ser. No. 628,387

3 Claims. (Cl. 248—65)

The present invention relates to novel support members for electrical buses, and more particularly to novel members adapted to be welded to tubular aluminum buses of the type used in power substations for connecting such buses to a support structure.

An important object of the present invention is to provide a novel bus support fitting which is of simple, rugged and economical construction and which may be readily and securely welded to a bus and easily secured to a complementary support structure.

Another object of the present invention is to provide a novel bus support member of the above described type which is formed so that a superior and stronger support for a bus is obtained without unduly increasing the bulk of material at the junction between a bus and the support member so as to reduce any possibility of the joint becoming overheated.

Other objects and advantages of the present invention will become apparent from the following description and the accompanying drawings wherein:

Fig. 1 is a fragmentary perspective view showing a bus support member constructed in accordance with the present invention associated with but not yet welded to a tubular bus;

Fig. 2 is a plan view of the support member shown in Fig. 1;

Fig. 3 is an enlarged cross sectional view taken generally along line 3—3 in Fig. 1 and further showing the support member welded to the bus;

Fig. 4 is a fragmentary perspective view similar to Fig. 1 but showing a modified form of the present invention;

Fig. 5 is a plan view of the support member shown in Fig. 4; and

Fig. 6 is a sectional view taken generally along line 6—6 in Fig. 4 and further showing the support member welded to the bus.

Referring now more specifically to the drawings wherein like parts are designated by the same numerals throughout the various figures, a bus support member 10 incorporating the features of the present invention is shown in Figs. 1, 2 and 3. The support member is adapted to be bolted to a complementary support structure, not shown, and is also adapted to accommodate and to be welded to an elongated tubular aluminum bus 12 for supporting the bus. The support member is a one-piece casting of a non-heat treatable high strength aluminum alloy which will not lose its physical properties and strength when subjected to welding temperatures. Thus, the operation of welding the fitting or support member to the bus will not substantially adversely affect the strength and ruggedness of the support member. An aluminum alloy such as ASTM ZG32A which is commercially available under the name Apex Smelting Ternalloy 5 has been found to be desirable for the support member.

The support member 10 comprises a main body 14, and flanges 16 and 18 extending laterally from opposite ends of the body. These flanges are respectively provided with axially aligned substantially semi-circular seats 20 and 22 adapted to receive the tubular bus 12 as shown in Figs. 1 and 3. The seat 20 in effect provides the flange 16 with a pair of finger portions 24 and 26 which are adapted to extend along opposite sides of the bus and the flange 18 is similarly provided with finger portions 28 and 30. The support member may be easily secured to the bus by providing weld beads between the bus and axially inner and outer margins of each of these seats 20 and 22. In addition, it is to be noted that the finger portions 26—30 are respectively provided with outwardly flaring or beveled end surfaces 32, 34, 36 and 38 for facilitating the application of weld beads between the bus and the ends of the finger portions. In Fig. 3 weld beads 40 and 42 are shown between the bus and axially inner marginal portions of the seat 20 and continuations 44 and 46 of these weld beads are shown between the bus and the beveled surfaces 32 and 34. It is understood that these weld beads will be continued along the axially outer margin of the seat 20 and that similar weld beads are to be provided between the bus and the axially inner and outer margins of the seat 22 and the end surfaces 36 and 38.

The support member body 14 is largely composed of a pair of substantially flat opposite side portions 48 and 50. These body portions are respectively provided with slots 52—54 and 56—58 which are spaced about and extend circumferentially of an imaginary circle and are adapted to accommodate bolts or screws 60, 62, 64 and 66 for securing the support member to a complementary support structure, not shown. This arrangement of the slots enables the support member to be adjustably turned a limited amount with respect to the complementary support structure so that the common axis of the seats 20 and 22 may be properly aligned with the longitudinal axis of a bus to be welded to the support member. It is to be noted that the bottoms of the seats 20 and 22 are spaced laterally substantially from the main body portions 48 and 50 so that the bus will also be substantially spaced from the main body portions 48 and 50. This enables air to circulate freely around the bus and support member for cooling purposes. The support member body has a relatively narrow central rib portion 68 extending continuously between the flanges 16 and 18, which rib portion, as shown best in Fig. 3, has an inverted generally V-shaped transverse cross section and includes upwardly converging leg portions 70 and 72 and a narrow transverse portion 74 substantially parallel to the body portions 48 and 50. The portion 74 has a curved outer surface 76 which conforms to the surface of the tubular bus 12. While the bus 12 is spaced from the main body portions 48 and 50 of the support member, the rib portion 68 combines with the flanges 16 and 18 to support the bus throughout the entire length of the fitting or support member. Weld beads 78 and 80 may be provided between the bus and opposite longitudinal margins of the rib section 74.

In Figs. 4, 5 and 6 there is shown a fitting or support member 10a embodying a modified form of the present invention, which support member is especially adapted for providing a sliding connection between the bus and a complementary support structure, not shown, for accommodating relative expansion and contraction between the parts. The support member 10a is similar to the above described structure as indicated by the application of identical reference numerals with the suffix a added to corresponding elements. This embodiment differs in that the body 14a is substantially elongated and the body portions 48a and 50a are respectively provided with elongated longitudinally extending slots 82 and 84 for accommodating the screws or bolts. When the support member 10a is installed, the bolts are tightened against sleeves 85, 87, 89 and 91 which maintain a fixed clearance between the bolt heads and the casting so that upon expansion or contraction of the bus the support member 10a may move with the bus and slide relatively to the complementary support structure, not shown. Triangular webs 86, 88, 90 and 92 are provided between outer laterally extending margins of the flange finger portions 24a—30a respectively for absorbing axial thrust which may be imparted to the flanges.

While the preferred forms of the present invention have been shown and described herein, it is obvious that many structural details may be changed without departing from the spirit and scope of the appended claims.

The invention is claimed as follows:

1. A support member for a tubular aluminum electrical bus comprising a one-piece nonheat treatable high strength aluminum alloy casting including a body portion having opposite substantially flat side portions of predetermined thickness and a central relatively low and longitudinally elongated rib portion between and projecting laterally in one direction from said side portions, said rib portion having inverted generally V-shaped transverse cross section and a wall thickness similar to said predetermined thickness, said rib portion having a transverse outer end surface spaced laterally from said side portions and having an arcuate transverse cross section substantially wider than said predetermined thickness for accommodating a tubular bus, and a pair of flanges respectively integral with the opposite ends of said side and rib portions and projecting laterally in said one direction from said side and rib portions, said flanges including axially aligned substantially semicircular seats for accommodating a bus, bottommost portions of said seats providing continuations of said rib portioned surface so that a bus may be supported by said seats and said rib portioned surface and will be laterally spaced at a low height from said side portions when the support member is assembled with the bus, each of said flanges including a pair of finger portions partially defining and separated by its substantially semicircular seat for extending along opposite sides of a bus, said flanges being adapted to be secured to the bus by weld beads between the bus and axially inner and outer surfaces of the flanges, and said finger portions respectively including outwardly beveled end surfaces extending from said seats for facilitating application of weld beads between the bus and the ends of the finger portions.

2. A support member, as defined in claim 1, which includes a plurality of spaced slot means through said body side portions extending circumferentially of a common circle for accommodating bolts and the like adapted to secure the support member to a support structure in a manner which enables adjustment of said support member about an axis of said circle, said slot means being located substantially entirely between imaginary planes defining opposite side edges of the said flanges.

3. A support member, as defined in claim 1, which includes elongated longitudinally extending slot means in each of said body side portions for accommodating bolts and the like for securing said support member to a support structure in a manner which permits axial sliding of the support member with respect to the support structure, said slot means being located substantially entirely between imaginary planes defining opposite side margins of said flanges.

References Cited in the file of this patent

UNITED STATES PATENTS

| | | |
|---|---|---|
| 433,141 | Peck | July 29, 1890 |
| 1,630,037 | Stresau | May 24, 1927 |
| 1,787,787 | Kress | Jan. 6, 1931 |
| 1,810,825 | Furrer | June 16, 1931 |
| 2,074,136 | Welch | Mar. 16, 1937 |
| 2,197,728 | Lee | Apr. 16, 1940 |
| 2,561,540 | Sherbrooke | July 24, 1951 |
| 2,598,836 | Scheele | June 3, 1952 |
| 2,616,646 | Matthysse | Nov. 4, 1952 |